3,644,645
INSECT CONTROLLING COMPOSITIONS AND
METHODS OF USE
Carl Bordence, Ponte Vedra Beach, and John M. Derfer, Jacksonville, Fla., assignors to SCM Corporation, Cleveland, Ohio
No Drawing. Original application Jan. 9, 1967, Ser. No. 607,876, now Patent No. 3,446,843, which is a continuation-in-part of application Ser. No. 479,009, Aug. 11, 1965. Divided and this application July 26, 1968, Ser. No. 753,031
Int. Cl. A01n 9/20
U.S. Cl. 424—325                                49 Claims

ABSTRACT OF THE DISCLOSURE

Novel insectiphobic compositions comprising beta-dialkylaminoalkyl ethers and thio-ethers of defined non-terpenoid organic alcohols and mercaptans are described. The compositions comprise the compounds which are used in conjunction with conventional insectiphobic carriers. The compositions have been found to be effective insecticides and insect repellents and in certain instances have been found to be synergizers for conventional insecticides such as the pyrethrins and allerthrin.

---

This application is a division of United States Pat. application Ser. No. 607,876, now United States Pat. 3,446,843, which is in turn a continuation-in-part of United States Pat. application Ser. No. 479,009, Aug. 11, 1965, now abandoned, said continuation-in-part application and said parent application being assigned to the same assignee as the present application. The subject matter of each application is incorporated herein by reference.

The present invention relates to a novel class of insectiphobic compounds, to insectiphobic compositions containing the compounds and to processes for controlling common insect pests.

The term "insectiphobic compound" or "insectiphobic composition" as used herein are intended to mean and to refer to compounds or compositions which have insecticidal and/or insectifugal (i.e. insect repellent) properties.

Preparations capable of killing and/or repelling common insect pests are generally valuable in the promotion of health and comfort. It has presently been found that certain hereinafter defined β-dialkylaminoalkyl ethers of terpene alcohols and certain ether analogs thereof which comprise the compounds of this invention and the active components of the compositions of this invention unexpectedly have been insecticidal and insectifugal properties. Generally known insecticides (such as, for example, DDT) have little or no insect repellent properties and the greater majority of known insect repellents (such as, for example, dimethyl phthalate) do not have insecticidal properties.

The terms "ether" or "terpene ether" as used herein are intended to mean and to refer to a novel class of compounds falling within the scope of Formula I below.

The invention provides, in one aspect, a novel class of compounds represented by the formula:

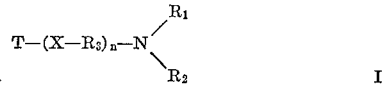

where T is selected from the group consisting of terpenyl and sesquiterpenyl, $R_3$ is lower alkylene, $R_1$ and $R_2$ are like or dissimilar lower alkyls, $n$ is an integer of from 1 to 3, X is sulfur or oxygen but when $n$ is one, X is sulfur and when $n$ is greater than one, X represents at least one oxygen atom.

Compounds falling within the scope of the above formula and compositions containing them, when used to contact an insect environment, remove the insects therefrom either through repellency or death.

The term "insect environment" as used herein is intended to mean and to include (1) areas or surfaces which are infested with, or which are susceptible to infestation by, common insect pests such as mosquitoes, flies, gnats, fleas, roaches and the like, and (2) the surfaces of the body of the insect itself including exoskeletal and non-skeletal surfaces of the insect.

The compounds and compositions of this invention are relatively non-toxic to higher animals and man and have been fed to warm-blooded animals in concentrations and amounts above those that are insectiphobically effective without significant adverse effects. The compounds and compositions containing them have also been applied in insectiphobically effective amounts to the skin of human beings and laboratory animals (e.g. albino rabbits) without significant harmful effects. Standard evaluation tests have shown that the ethers are not hazardous skin irritants.

In the above Formula I, T is terphenyl or sesquiterpenyl and can represent any of a wide variety of terpenyl or sesquiterpenyl groups. When T represents terpenyl, T can be an acyclic, cyclic or bicyclic terpenyl. When T represents sesquiterpenyl, T can be acyclic, monocyclic, bicyclic or tricyclic sesquiterpenyl.

Acyclic terpenyl groups which can be represented by T which fall within the scope of Formula I include, for example, citronellyl, bupleuryl, geranyl, neryl, lavandulyl, linalyl and myrcenyl. Advantageous compounds are those wherein T represents geranyl or linalyl.

Monocyclic terpenyls which can be represented by T in Formula I include menthyl, tetrahydrocarvyl, alpha-terpinyl, beta-terpinyl and gamma-terpinyl, the terpinnyls, dihydrocarvyl, piperityl, isopulegyl, carvyl and the like. Compounds where T represents carvyl or isopulegyl have been found to be advantageous due to their insectiphobic activity.

Bicyclic terpenyl groups represented by T include nopylsabinyl, thujyl, pinocamphanyl, camphanyl, myrtenyl, verbenyl, caranyl, pinocarvyl, the santenyls, bornyl isobornyl, fenchyl, isofenchyl, etc. Of these compounds, terpene ethers wherein T represents camphanyl, verbenyl, pinocarvyl and bornyl have been found to be especially effective insectiphobic agents.

As previously noted, T can also represent a sesquinterpenyl and can include acyclic, monocyclic, bicyclic and tricyclic sesquiterpenyls. Examples of compounds wherein T represents acyclic sesquiterpenyls and which fall within the scope of Formula I include farnesyl and nerolidyl. Examples of monocyclic sesquiterpenyls represented by T include bisabolyl and zingiberyl; examples of bicyclic sesquiterpenyls include cadinyl, caryophyllenyl and selinyl; examples of tricyclic sesquiterpenyls include cedryl and santalyl. As will be evident hereinafter from the specific examples, sesquiterpenyl ether compounds falling within the scope of Formula I which have been found to have a high degree of insectiphobic activity are those wherein T is farnesyl or caryophyllenyl.

It has been found that when, in Formula I, T is a terpenyl or sesquiterpenyl group which contains an allylic linkage within its structure, the compounds have a significantly higher insectiphobic activity than is the case when T represents a non-allylic terpenyl or sesquiterpenyl. It is to be understood, however, that the non-allylic terpenyl and sesquiterpenyl ether compounds are also efficient and effective insectiphobic agents. Examples of terpenyls and sesquiterpenyls which contain such allylic linkage include geranyl, linalyl, verbenyl, carvyl, pinocarvyl and sabinyl groups.

In Formula I, X is sulfur or oxygen and $n$ is an integer of from 1 to 3, but when $n$ is one, X represents sulfur, when $n$ is greater than one (e.g. when $n$ is two or three), X represents at least one oxygen atom. Compounds where $n$ is one and X represents sulfur have been found to possess a high degree of insectiphobic activity and are represented by the formula:

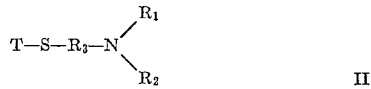

II where T, $R_1$, $R_2$ and $R_3$ are as hereinbefore described.

Compounds falling within the scope of Formula I where X is sulfur or oxygen and when $n$ is greater than one, X represents at least one oxygen atom are compounds of the formula:

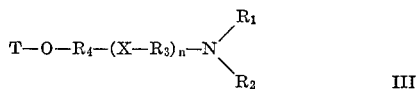

III where X is sulfur or oxygen, $n$ is an integer of 1 or 2, T, $R_1$, $R_2$ and $R_3$ are as above described and $R_4$ is lower alkylene.

Subclasses of insectiphobically advantageous compounds falling within the scope of Formula III include compounds of the formulae:

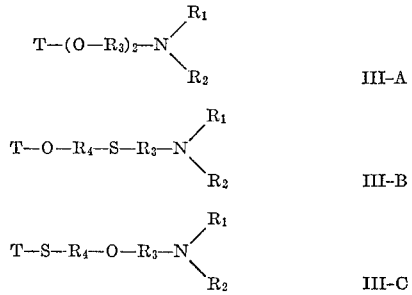

where in Formulae III–A, B and C, T, $R_1$, $R_2$, $R_3$ and $R_4$ are as above-described.

In the above Formulae I, II and III, $R_3$ is a lower alkylene group, and $R_1$ and $R_2$ are like or dissimilar lower alkyl groups. $R_1$, $R_2$ and $R_3$ can contain from one to eight carbon atoms, but preferably contain from two to four carbon atoms since compounds in which the lower alkylene and lower alkyl groups contain from five to eight carbon atoms often tend to be insoluble or to have low dispersibility in liquids in which they are employed. Although $R_3$ can be methylene, propylene or butylene, and $R_1$ and $R_2$ can be methyl, propyl or butyl, particularly advantageous compounds are those wherein $R_3$ represents ethylene, and $R_1$ and $R_2$ represent ethyl.

As noted hereinbefore $R_4$ is lower alkylene and is equivalent to $R_3$. In Formulae III–B and III–C, compounds where $R_3$ and $R_4$ are like lower alkylenes are preferred for economic reasons. Compounds having an especially high degree of insectiphobic activity are those where $R_3$ and $R_4$ are ethylene.

Compounds falling within the scope of all the above formulae are water insoluble and are generally soluble in the conventional organic solvents employed in insectiphobic formulations. The compounds are usually liquid, have the general properties of oils, and boil between 100° and 170° C., the boiling points being measured at a pressure of 1 mm. of mercury.

The insectiphobic compounds of this invention are usually employed in conjunction with a carrier or diluent or a mixture of conventional carriers or diluents, and when in such form, will be hereinafter referred to as insectiphobic compositions.

The amount of terpene ether compounds employed in the insectiphobic compositions of the present invention can vary widely between about 0.1 to about 90 weight percent, depending upon the intended end use. Usually, the compositions will contain between about 0.1 to about 10 weight percent of one or more of the compounds hereinbefore described, and the compound is usually in intimate mixture with the carrier. When it is desired to use an insectiphobic composition directly (i.e. without further dilution), the amount of the terpene compound will usually vary from between 0.1 to about 0.5 weight percent. When it is desired to formulate a concentrated composition, i.e. one suitable for dilution prior to end use, the terpene ether compounds will usually be present in the composition in an amount of from about 0.5 to about 90 weight percent.

From a practical standpoint, compositions containing from 0.5 to 10 weight percent of terpene ether can be advantageously employed for general end use dilution.

The carrier employed can be any carrier conventionally used in insecticidal and/or insect repellent formulations with the proviso that the carrier should be inert (i.e., it should be incapable of undergoing a chemical reaction with the terpene ether). The carrier should also be one that will not be harmful to the environment, other than the insect, in which it is employed. The carrier can be any one of a variety of organic and inorganic liquid, solid or semi-solid carrers or carrer formulations conventionally used in insecticidal or insect repellent products and can be a mixture of such carriers.

Examples of organic liquid carriers include liquid aliphatic hydrocarbons such as pentane, hexane and heptane, nonane, decane and their analogs as well as liquid aromatic hydrocarbons. Examples of other liquid hydrocarbons which are widely used for economic reasons include oils produced by the distillation of coal and the distillation of various types and grades of petrochemical stocks. Petroleum oils which are especially useful and economical include kerosene oils (e.g. oils composed of hydrocarbon mixtures of low molecular weight and which have from ten to sixteen carbon atoms), which are obtained by fractional distillation of petroleum at between 360° F. and 510° F. and which usually have a flash point between 150° F. and 185° F. Other petroleum oils include those generally referred to in the art as agricultural spray oils which are light and medium spray oils consisting of the middle fractions in the distillation of petroleum, and have a viscosity in the range of from 40–85 sec. Saybolt at 100° F. and are only slightly volatile. These oils are usually highly refined and contain only minute amounts of unsaturated compounds as measured by standard sulfonation tests. The customary sulfonation range of such oils is between 90 percent and 94 percent of unsulfonatable residue. These oils are paraffin oils and can be emulsified with water and an emulsifier and diluted to lower concentrations and used as sprays. Tall oils obtained from sulfate digestion of wood pulp, like paraffin oils, can also be employed.

In addition to the above-mentioned liquid hydrocarbons and often employed in conjunction therewith, the carrier can contain conventional emulsifying agents (e.g. a nonionic surfactant such as an ethylene oxide condensate of octyl phenol or an anionic surfactant such as an alkali metal salt of an alkylbenzenesulfonic acid). Such emulsifiers are used to permit the composition to be dispersed in and diluted with water for end-use applications.

When paraffin oils are employed as carriers in the insectiphobic compositions of this invention, they are usually used in conjunction with an emulsifier, the mixture being diluted with water immediately prior to the end-use application. By way of example, when a terpene ether compound falling within the scope of this invention is dissolved in paraffin oil containing an emulsifier, and such compositions are subsequently diluted with water to form an oil-water emulsion, the emulsions when atomized and sprayed on insects and/or insect-infested areas, are highly effective against insects and insect eggs that may be in the area.

Other suitable paraffin oils, particularly those used with emulsions, are referred to in the art as heavy paraffin oils and usually have a viscosity greater than 85 sec. Saybolt at 100° F.

Other advantageous organic liquid carriers can include liquid terpene hydrocarbons and terpene alcohols( e.g. alpha-pinene, dipentene, terpineol, and the like). Still other liquid carriers include organic solvents such as aliphatic and aromatic alcohols, esters, aldehydes and ketones. Aliphatic monohydric alcohols include methyl, ethyl, n-propyl, isopropyl, n-butyl, sec-butyl and t-butyl alcohols. Suitable dihydric alcohols include glycols such as ethylene and propylene glycol and the pinacols (alcohols having the empirical formula $C_6H_{12}(OH)_2$). Suitable polyhydroxy alcohols include glycerol, arabitol, erythritol, sorbitil and the like. Suitable cyclic alcohols include cyclopentyl and cyclohexyl alcohols.

Conventional aromatic and aliphatic esters, aldehydes and ketones may be employed and are usually used in combiination with the above-mentioned alcohols. Still other liquid carriers including high-boiling petroleum products such as mineral oil and higher alcohols (sometimes referred to as "liquid waxes") such as cetyl alcohol, may also be employed. Additionally, conventional "potentiators" or "synergizers" such as piperonyl butoxide may be employed in conjunction with, or as a component of, the carriers comprising the compositions of this invention.

Solid carriers which may be used in the compositions of this invention include finely divided inorganic solid materials. Suitable finely divided solid inorganic carriers include siliceous minerals such as clays (e.g. bentonite, attapulgite, fuller's earth, diatomaceous earth, kaolin, mica, talc, and finely divided quartz, etc.) as well as synthetically prepared siliceous materials such as silica aerogels and precipitated and fume silicas.

Examples of finely divided solid organic materials include starch, flour, sugar, sawdust, casein, gelatin and the like.

Examples of semi-solid carriers include petroleum jelly, lanolin and the like, and mixtures of liquid and solid carriers which provide semi-solid carrier products.

The above-described compositions can be employed per se or can be diluted with suitable liquids or solids to exterminate or repel common insect pests such as roaches, termites, beetles, flies, weevils, moths, ticks, chinch bugs, lice, mites and the like. These compositions, when used to contact an insect environment, effectively cause the disappearance of the insects either through repellency and/or death. By way of example, one advantageous embodiment of a composition of this invention comprises from about 0.1 to about 90 percent, preferably 0.1 to about 10 percent, by weight of a hereinbefore described terpene ether, in intimate mixture with one or more of the above-mentioned carriers.

When the compositions are intended to be used as insecticides, insect pests may be killed by contacting a portion of the exoskeleton of the insect in a liquid, solid or semi-solid composition. The contact may be accomplished directly (e.g. by atomizing the composition into the air as a liquid or as a dust so that the material will fall on the insects). Alternatively, the contact may be indirectly effected by contacting the surfaces on which the insects may alight or crawl. By way of example, joists or attic beams infested with roaches can be contacted with the compositions, and insects crawling over the joists and beams will pick up sufficient amounts of active material to cause death. Where it is contemplated to use the compositions as insectifuges (i.e. repellents), infested areas or areas potentially subject to infestation can be contacted and the insects will be repelled from the treated areas.

By way of further example, insect-infested animals such as dogs with fleas or poultry with lice may be treated with the terpene ether-containing compositions by contacting the fur and/or feathers, and the lice and fleas contained therein, thereby ending the insect infestation and preventing reinfestation, due to the repellent properties of the composition, for significant periods of time. Also, granaries and silos can be treated with the compositions of this invention, prior to grain storage, to prevent weevil and other insect infestations in the grains to be subsequently stored. As will be evident from the specific examples, when the compositions of this invention are employed as repellents, the amount of terpene ether in the composition is usually present in a lower concentration than when the compositions are to be employed as insecticides.

The advantages realized by employing the compositions as insect repellents include the provision of insect repellency against biting insects such as mosquitoes, houseflies, stable flies, black flies, fleas and ticks. As will be further evident from the specific examples, certain embodiments of the compositions of this invention may be applied to the skin of human beings or animals and to the clothing of the former to prevent mosquitoes, flies, fleas, lice, etc. from alighting on the skin or clothing during the time when the user remains in an area infested with insects. Thus, biting flies such as stable flies, strawberry and deer flies and mosquitoes are shown in the specific examples to have been repelled by certain compositions of this invention for prolonged periods of time (e.g. up to ten days or more).

The terpene ethers falling within the scope of Formula II are suitably prepared by reacting a terpene mercaptan with a dialkylaminohaloalkane hydrohalide in the presence of an aqueous solution of an alkali metal hydroxide at a temperature in the range of from about 50° C. to about 90° C. Upon completion of the reaction, there is formed an aqueous layer and an oil layer, the latter layer containing the dialkylaminoalkyl thioether of the terpene.

The oil layer can be separated from the aqueous layer by well-known means such as, for example, by decantation, and the terpene thioether can be recovered therefrom by fractional distillation, usually at subatmospheric pressures.

One specifically advantageous method of preparation of the terpene thioethers comprises reacting one mol of a terpene mercaptan with 0.66 mol of a β-dialkylaminochloroalkane hydrochloride by mixing and stirring these materials at room temperature during which time there is added to the mixture, while stirring is continued, an aqueous solution containing 40 to 50 weight percent of an alkali metal hydroxide. After completion of the addition of the alkali metal hydroxide solution, the reaction mixture is heated at a temperature between about 50°–90° C. for one hour with stirring. After this period stirring is discontinued, and the material is cooled to room temperature during which time the oily layer containing the thioether separates from the aqueous layer and can be recovered as above-described.

Compounds falling within the scope of Formula III can be readily prepared by reacting a compound of the formula T—X—R—XH (where T and R are as above-described, X is sulfur or oxygen and one X represents an oxygen atom) with a β-dialkylaminochloroalkane hydrochloride in stoichiometric amounts in the presence of a base such as, for example, an alkali metal hydroxide at a temperature between 50° and 90° C. Recovery of the reaction products is accomplished in a manner identical to that described in connection with processes for preparing compounds falling within the scope of Formula II.

The invention also provides a class of compounds of the formula

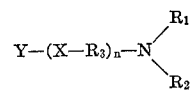

IV where Y is terpenoid, or a non-terpenoid organic radical selected from the class consisting of substituted and unsubstituted saturated, and substituted and unsubstituted unsaturated aliphatic and cyclo-aliphatic groups and substituted and unsubstituted aryl, alkaryl and aralkyl groups, $R_3$ is lower alkylene, $R_1$ and $R_2$ are like or dissimilar alkyls, $n$ is an integer of from 1 to 3, X is sulfur or oxygen, and when $n$ is one X is sulfur, and when $n$ is greater than one X represents at least one oxygen atom.

The term "terpenoid" as used herein is intended to mean and to refer to terpene and sesquiterpene radicals of the type hereinbefore described.

Compounds falling within the scope of Formula IV are substantially non-toxic to human beings and warm-blooded animals and, as will be evident from the specific examples, the compounds are efficient insectiphobic agents. Surprisingly, the compounds are also synergistic agents for conventional insecticides such as, for example, pyrethrinoid compounds such as the pyrethrins and allethrin.

A subclass of compounds falling within the scope of Formula IV where $n$ is one and X is sulfur have the formula:

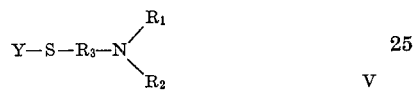

where Y, $R_1$, $R_2$ and $R_3$ are as hereinbefore described.

Compounds falling within the scope of Formula IV, where X is sulfur or oxygen and when $n$ is greater than one, X represents at least one oxygen atom are compounds of the formula:

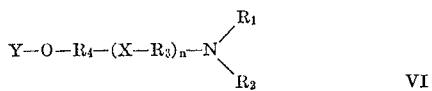

where X is sulfur or oxygen, $n$ is an integer of one or two, Y, $R_1$, $R_2$ and $R_3$ are as hereinbefore described and $R_4$ is lower alkylene.

Subclasses of insectiphobically advantageous compounds falling within the scope of Formula VI include compounds of the formulae:

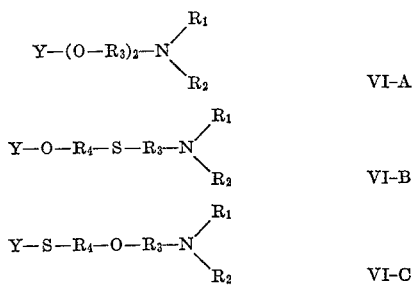

where in Formulae III–A, B, and C, Y, $R_1$, $R_2$, $R_3$ and $R_4$ are as above-described. In Formula VI–B and VI–C, compounds where $R_3$ and $R_4$ are like lower alkylenes are preferred for economic reasons. Compounds having an especially high degree of insectiphobic activity are those where $R_3$ and $R_4$ are ethylene.

In the above Formulae, IV, V and VI, Y is the hereinbefore described terpenoid or any of a wide variety of non-terpenoid groups or radicals including: substituted and unsubstituted saturated aliphatic and cyclo-aliphatic groups; substituted and unsubstituted unsaturated aliphatic and cyclo-aliphatic groups; substituted and unsubstituted aryl groups; alkaryl and aralkyl groups; and halo-, nitro-, and amino-substituted derivatives thereof. Compounds where Y is, or contains a heterocyclic group are usually ineffective as insectiphobic agents and are also relatively poor synergists for other insecticidal agents.

Compounds falling within the scope of Formula V may be suitably prepared by reacting a mercaptan of the above-described groups with a dialkylaminohaloalkanehydrohalide of the formula:

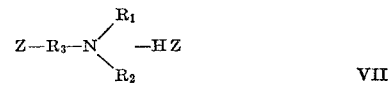

(where Z is a halogen, preferably chlorine or bromine, and $R_1$, $R_2$ and $R_3$ are as above-described) in the presence of a base.

Compounds falling within the scope of Formula VI may be prepared by reacting a compound of the formula Y—X—R—XH with a compound falling within the scope of Formula VII (where Y is as hereinbefore described, R is lower alkylene, X is sulfur or oxygen but X represents at least one oxygen atom) in the presence of a base.

Examples of saturated acyclic aliphatic groups or radicals which can be represented by Y in Formulae IV, V and VI include methyl, ethyl, n-propyl, isopropyl, n-butyl, sec-butyl, t-butyl, pentyl, hexyl, heptyl, octyl, nonyl, decyl, undecyl, dodecyl, etc., groups or radicals and halo-, nitro-, amino- and lower alkyl-substituted derivatives of these acyclic aliphatic groups. Compounds where Y is octyl or heptyl have been found to be particularly effective insectiphobic agents.

Examples of saturated cyclo-aliphatic groups or radicals which are represented by Y include cyclo-pentyl, cyclo-hexyl and cyclo-octyl groups or radicals and halo-, nitro-, amino- and lower alkyl-substituted derivatives of these cyclo-aliphatic groups and radicals.

Examples of unsaturated acyclic aliphatic groups or radicals which can be represented by Y include allyl, crotyl, sorbyl, linoleyl, oleyl, di-isobutenyl-carbinyl, etc., groups or radicals, and halo-, nitro-, amino- and lower alkyl-substituted derivatives of these unsaturated groups or radicals.

Examples of unsaturated cyclo-aliphatic groups or radicals which can be represented by Y include cyclo-pentenyl, cyclo-pentadienyl, cyclo-hexenyl, cyclo-octenyl, cyclo-dodecenyl, vinylcyclohexenyl and the like, and halo-, nitro-, amino- and lower alkyl-substituted derivatives of these unsaturated cyclo-aliphatic compounds.

Examples of aryl groups which can be represented by Y include phenyl, naphthyl, tetrahydronaphthyl, phenanthryl, anthracyl, dihydroanthracyl, and halo-, nitro, amino-substituted derivatives of these aryl groups.

Examples of alkaryl groups which can be represented by Y include tolyl, xylyl, cumyl, vinyl-phenyl, methylnaphthyl, cymyl, ethyl naphthyl, etc., and halo-, nitro-, and amino-substituted derivatives of these alkaryl groups.

Examples of aralkyl groups which can be represented by Y include benzyl, phenyl-ethyl, phenyl-hexyl, styryl, cinnamyl, and the like, and halo-, and nitro- and amino-substituted derivatives of these aralkyl groups.

Preferred compounds falling within the scope of Formulae IV, V and VI where Y represents a saturated acyclic aliphatic group are those where Y is hexyl, mono-chloro-hexyl, methyl-hexyl, ethyl-hexyl, heptyl, octyl and mono-chloro-octyl; preferred compounds where Y represents an unsaturated acyclic aliphatic group include those where Y is oleyl, linoleyl and di-isobutenyl carbinyl; preferred compounds where Y represents a cyclo-aliphatic group are those in which Y is cyclo-pentyl, cyclo-hexyl or cyclo-octyl and the mono-chloro-derivatives thereof; preferred compounds where Y represents an aryl group are those where Y is phenyl, chloro-phenyl and α-naphthyl; preferred compounds where Y represents an aralkyl group are those where Y is benzyl, styryl and chloro-derivatives thereof; preferred compounds where Y represents an alkaryl are those where Y is tolyl, cumyl or cymyl.

As will be evident from the specific examples, the foregoing compounds are preferred in that they exhibit a high degree of insectiphobic activity and are capable synergizing conventional insecticides such as the pyrethrins and allethrin.

The invention also provides, in another aspect, a process for controlling insects which comprises contacting an insect environment with a compound or a composition containing a compound of the formula:

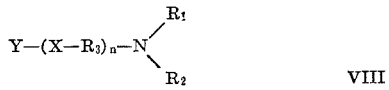

where Y is terpenoid or a non-terpenoid organic group selected from the class consisting of substituted and unsubstituted saturated and substituted and unsubstituted unsaturated aliphatic and cyclo-aliphatic groups and substituted and unsubstituted aryl alkaryl and aralkyl groups, $R_3$ is lower alkylene, $R_1$ and $R_2$ are like or dissimilar lower alkyls, $n$ is an integer of from one to three and when $n$ is one, X is selected from the group consisting of sulfur and oxygen and when $n$ is greater than one, X represents at least one oxygen atom.

Compounds falling within the scope of Formula VIII have been found to be effective in controlling insects either through repellency or death. Insectiphobic conpositions containing the compounds of this invention comprise mixtures of compounds falling within the scope of Formula VIII and the carriers hereinbefore described in connection with the description of terpene-ether and thioether containing compositions.

The following specific examples are intended to illustrate the invention but not to limit the scope thereof, parts and percentages being by weight unless otherwise specified.

EXAMPLE 1

Three separate dispersions consisting of 0.35 percent by weight, respectively, of nopyl, carvyl, and verbenyl β-diethylaminoethyl ethers and one percent by weight of an emulsifying agent (Triton X–100, a commercially available nonionic surfactant which is an ethylene oxide condensate of ethylene oxide with octyl phenol) and water were prepared.

Three separate screen-sleeved cages 10 inches in diameter and 10 inches high containing 50 houseflies each were sprayed, using a typical sprayer, with 5 milliliters of one of the above-described dispersions. The spray was emitted from the nozzle of the spraying device at a distance of 12 inches above the cages. The total quantity of a given ether in the air was in each instance 17.5 milligrams. The ethers knocked down (e.g. stunned) 100 percent of the houseflies in the cages. In the cage sprayed with the nopyl ether 60 percent of the houseflies were dead within one hour. In the cage sprayed with the carvyl ether dispersion 74 percent of the houseflies were killed, and in the cage sprayed with the verbenyl ether dispersion 82 percent of the houseflies were killed.

When β-dimethylaminoethyl ethers of nopol, carveol and verbenol are substituted for the β-diethylaminoethyl ethers empolyed in the dispersion of Example 1, the knockdown of flies and the percent of kill obtained is substantially the same as results set forth in that example.

When the corresponding β-diethylaminoethyl thioethers of nopol, carveol and verbenol are employed, an equivalent knockdown and a slightly higher percent of kill is obtained.

EXAMPLE 2

Three separate dispersions consisting of 0.35 percent by weight, respectively, of nopyl, geranyl and carvyl β-dimethylaminoethyl ethers and 0.35 percent by weight of piperonyl butoxide (a conventional synergistic solvent) and one percent by weight of the emulsifying agent (employed in Example 1) in water were prepared.

Three separate cages (10 inches x 10 inches x 10 inches), each containing 20 adult male German cockroaches, were sprayed at 6 inches above each cage with 1 cc. volumes, respectively, with one of the terpene ether dispersions above-described. The nopyl ether dispersion killed 20 percent of the insects, the geranyl ether dispersion killed 80 percent, and the carvyl ether dispersion killed 25 percent of the cockroaches in the respective cages within 48 hours. The total amount of ether sprayed in the air in each instance was 3.5 milligrams.

When corresponding β-diethylaminoethyl ethers of the terpene alcohol are used in place of the β-dimethylaminoethyl ethers employed in Example 2, the percent of kill of the cockroaches is slightly greater than that obtained with the corresponding β-dimethylaminoethyl ethers.

When the corresponding β-diethylaminiethyl thioethers of the terpene alcohols are used in place of the terpene ethers of Example 2, the percent of kill of the cockroaches is substantially that obtained in Example 2.

EXAMPLE 3

A dispersion consisting of 0.35 percent by weight of the β-dimethylaminoethyl ether of isopulegol, one percent by weight of the emulsifying agent employed in Example 1, 10 percent by weight of kerosene, the balance consisting of water, was prepared.

Five bean plants infested with a total of 50 Mexican bean beetles were sprayed, using a commercial sprayer, wtih 5 milliliters of the above dispersion. Five other plants infested with the same number of beetles were untreated and served as controls. The total quantity of isopulegyl ether sprayed into the atmosphere 12 inches above the plants was 17.5 milligrams.

After 48 hours the plants were examined and the treated group was free of Mexican bean beetles, demonstrating a 100 percent kill of these insects. The untreated plants contained the same number of Mexican bean beetles which had been present prior to the beginning of the experiment.

When the corresponding β-diethylaminoethyl ether of isopulegol is employed in place of the β-dimethylaminoethyl ether substantially the same results are obtained.

When the β-diethylaminoethyl thioether of isopulegol is used in the procedure of Example 3, all the insects (e.g. Mexican bean beetles) are killed.

EXAMPLE 4

Five separate dispersions (emulsions) consisting of 0.35 percent by weight, respectively, of the isopulegyl, nopyl, geranyl, carvyl and verbenyl β-dimethylaminoethyl ethers, one percent by weight of the non-ionic surfactant employed in Example 1, 10 percent by weight of acetone, the balance of the compositions consisting of water, were prepared.

Five separate groups of garden pea plants, each group being infested with a total of 50 pea aphids, were contacted, by spraying, respectively, with 5 milliliter quantities of one of the above-described dispersons. A sixth group of plants, infested with the same number of pea aphids, served as a control. The contact was effected by grouping the plants, which were in individual pots, closely together and spraying the plants with a dispersion in a conventional spraying device a distance of 12 inches above the plants. A total of 17.5 milligrams of each ether was sprayed into the air above the respective plant groups.

The plants were examined 48 hours after the treatment. Ninety percent of the pea aphids were killed in the group which had been sprayed with the isopulegyl ether, 80 percent had been killed in the group of plants treated with the nopyl ether, and 90 percent of the pea aphids were killed in the group of plants treated with the geranyl ether. The group of plants which had been treated with the carvyl ether were entirely free of the pea aphids, indicating a 100 percent kill of the insects by this ether. The group of plants which had been treated with the verbenyl ether contained only 10 percent of the insects originally present, demonstrating a 90 percent kill. The untreated plants were unaffected and contained the same number of aphids.

When the corresponding β-diethylaminoethyl ethers and the β-diethylaminoethyl thioethers are employed in place of the dispersions of the β-dimethylaminoethyl ethers, more than 90 percent of the pea aphids are killed.

EXAMPLE 5

Dispersions containing the geranyl, carvyl and verbenyl ethers employed in Example 4 were diluted with water until they contained 0.1 percent by weight of the ethers. Separate, new groups of plants containing the same number of pea aphids as the plants described in Example 4 were employed. A fourth group of plants was untreated and served as a control. The spraying procedures were identical to those employed in Example 4 except that 5 milligrams of the ethers were sprayed into the air above the plants in each instance. Examination of the plants after 48 hours showed the group of plants treated with the geranyl and the carvyl ether dispersions to be completely free of pea aphids. In the group of plants treated with the verbenyl ether there was a 70 percent reduction in the number of pea aphids.

When the corresponding β-diethylaminoethyl ethers and the β-diethylaminoethyl thioethers are employed in place of the β-dimethylaminoethyl ethers a 70–80 percent reduction in the number of pea aphids on the plants is obtained.

EXAMPLE 6

The dispersions containing the geranyl and carvyl ethers employed in the preceding example were diluted with equal parts of water, that is, they now contained 0.05 percent by weight of the geranyl and carvyl ethers. These dilute dispersions were evaluted using the procedures described in the preceding example. The group of plants treated with the geranyl ether demonstrated a 90 percent kill of pea aphids; the group of plants treated with the carvyl ether demonstrated a 10 percent kill of the pea aphids at this (0.05 weight percent) dilution. This experiment indicates that the geranyl ether is substantially equivalent in insecticidal activity to the widely-used insecticide malathion.

EXAMPLE 7

Six separate dispersions containing 0.35 percent by weight, respectively, of isopulegyl, nopyl, geranyl, carvyl, verbenyl and linalyl β-dimethylaminoethyl ethers, one percent by weight of the emulsifying agent employed in Example 1, 10 percent by weight of glycerol, the balance of the composition consisting of water, were prepared.

Seven separate groups of 20 lima bean seedlings, each group infested with a total of 100 spider mites, were contacted with one of the above-described dispersions. The contact was effected by spraying 3 milliliters of the dispersion, using a conventional spraying device, into the air at a distance of 12 inches above the plant groups. Six groups were treated with one of the dispersions and the seventh group was an untreated control. The amount of ether sprayed into the air above the plants was 10.5 milligrams. All groups of plants were examined for mites after 10 days. Seventy-five percent of the mites on the group of seedlings which had been treated with the isopulegyl ether were killed. One hundred percent of the mites on each of the three groups of plants which had been treated with the nopyl ether, the geranyl ether and the carvyl ether were killed; 70 percent of the mites on the group of plants which had been treated with the verbenyl ether were killed, and 90 percent of the mites on the plants which had been treated with the linalyl ether were killed. All of the mites on the untreated group of plants were alive.

When the corresponding β-diethylaminoethyl ether, the corresponding β-dimethylaminoethyl thioether and the β-diethylaminoethyl thioethers of the terpene alcohols tested in Example 7 are tested using the procedures of Example 7, more than 75 percent of the mites are killed in all instances.

EXAMPLE 8

A solution consisting of one percent by weight of the dimethylaminoethyl ether of verbenol dissolved in acetone was sprayed on 25 grams of commercial granulated sugar in an amount such that after mixing and drying the sugar-ether mixture contained one percent by weight of the verbenyl ether. One hundred houseflies were placed in a sleeve-screen test cake and starved for 2 hours. Thereafter the sugar-verbenyl-ether mixture and a like amount of pure granulated sugar were placed distally with respect to each other within the cages. Determinations of the number of flies visiting or alighting on the sugar-ether sample and the number of flies alighting on the pure sugar control sample were recorded for 10 minutes immediately following the introduction of the sugar into the cage. Thereafter the baits were removed for one hour and then reintroduced in reverse positions to initiate another test cycle. This procedure was repeated until 4 test cycles were conducted. During the 4 test cycles a total of 143 visits were made to the untreated or control sugar sample, whereas not one visit was made to the sugar-ether mixture, demonstrating a 100 percent repellency of the sugar sample.

EXAMPLE 9

The procedure of Example 8 was repeated except that the sugar-terpene ether mixture contained 0.1 percent by weight of the verbenyl diethylaminoethyl ether in place of the one percent by weight verbenyl-ether-sugar sample employed in Example 8. During the test 131 contacts were made to the untreated sugar during the test period, whereas no contact was made by the flies on the sugar containing 0.1 percent by weight of the verbenyl diethylaminoethyl ether, demonstrating a complete repellency of the verbenyl ether.

When the β-dimethylaminoethyl ether and the corresponding thioether or the β-diethylaminoethyl thioether of verbenol is employed using the procedures of Examples 8 and 9, complete repellency is obtained in all instances.

EXAMPLE 10

Solutions consisting of one percent by weight of the dimethylaminoethyl ether of verbenol in acetone and one percent by weight of the dimethylaminoethyl ether of pinocarveol were sprayed, respectively, on separate sheets of brown kraft (50 lb. weight) paper in amounts such that 1.4 milligrams of the verbenyl ether and pinocarvyl ether were present per square inch of the paper surface. Eight 6 inch x 12 inch strips of ether-treated paper were joined by their long edge to an equal strip of paper having a dimension of 2 inches x 5 inches. Each 6 inch x 12 inch section was then joined at its long edge to a similar untreated strip of paper. The test cylinders (5 inches in diameter and 2 inches high) containing the treated and untreated strips of paper were positioned so that the seam adjoining the treated and untreated papers formed the diameter of the test arena. After each count positions were reversed to counteract any indeterminable external influence on the distribution of the insects. Fifty German cockroaches (*Blatella Germanica*) were employed. The number of insects visiting the treated and untreated paper at each 5-minute time interval was tabulated and totaled. The insect repellency was determined by using the following formula:

$$100- \frac{\text{total number of insects on treated surface}}{\text{total number of insects on untreated surface}} \times 100 = \% \text{ repellency}$$

In the foregoing experiment 32 of the cockroaches were present on the untreated surface and 8 were present on the verbenyl ether-treated surface, demonstrating a repellency of 80 percent.

Thirty-six cockroaches were present on the untreated surface and 4 were present on the pinocarvyl ether surface, indicating a 90 percent repellency.

Substantially the same results are obtained when paper strips impregnated with the β-diethylaminoethyl thioethers of verbenol and pinocarveol are employed.

EXAMPLE 11

The following screening procedure demonstrates the repellency of the terpene ethers against the Yellow Fever mosquito.

One hundred Yellow Fever mosquitoes (*Aedes Aegypti L*) were placed in 20 mesh screen cylindrical cages having a diameter of 20 inches and a height of 20 inches. A solution consisting of 3.3 grams of the verbenyl dimethylaminoethyl ether dissolved in 20 milliliters of acetone was prepared. One foot square sections of the narrow portions of women's cotton stockings were impregnated with the acetone solution and permitted to dry. The amount of ether on the stockings was 1.65 grams per square foot.

The stockings were aged for one day. After this period an untreated nylon stocking was drawn over the arm of a human test subject and the treated cotton stocking was drawn over the nylon stocking about midway up the forearm. The hand was protected with a heavy cotton glove and the arm was exposed for one minute in the cage of test insects. If less than 5 bites were received the stockings were aged and retested daily for 10 days until 5 bites were received in a single 1-minute exposure.

No mosquito bites were received during the first 10 days of this test. On the 11th day 2 bites were received in the 1-minute period and on the 12th day 5 bites were received. The above experiment demonstrates the effectiveness of the verbenyl ether in repelling mosquitoes for more than 10 days under the test conditions.

When the diethylaminoethyl ethers and the corresponding thioethers of verbenol, linalool, geraniol, carveol and pinocarveol are employed in the experiment of Example 11 in place of the verbenyl dimethylaminoethyl ether employed in that example, repellency for 12 to 13 days is obtained.

EXAMPLE 12

The procedure of Example 11 was repeated except that 100 biting flies (e.g. the stable fly *Stomonys Calcitrans-L*) were employed in place of the Yellow Fever mosquitoes employed in that example. The verbenyl ether, impregnated in the cotton stocking, completely repelled stable flies for 14 days under the conditions of this experiment.

Substantially the same results are obtained when the following compounds are employed:

β-dimethylaminoethyl ethers of geraniol, linalool, carbeol and pinocarveol;
β-dimethylaminoethyl thioethers of geraniol, linalool, carveol and pinocarveol;
β-diethylaminoethyl ethers of geraniol, linalool, carveol and pinocarveol;
β-diethylaminoethyl thioethers of geraniol, linalool, carveol and pinocarveol.

The β-dialyklaminoalkyl ethers of the hereinbefore defined terpene alcohols and the thioether analogs thereof effectively kill and/or repel insects in dilutions often below the effective concentrations of malathion, DDT and dimethyl phthalate. Formulations of these dialkylaminoalkyl terpene ethers in carriers can be prepared using one or more of the hereinbefore defined ingredients by methods which are apparent to those skilled in the art. It is also to be understood that when used as insect repellents the β-dialkylaminoalkyl terpene ethers may be incorporated in conventional cosmetic formulations such as cosmetic creams or ointments. It is evident from the foregoing specific examples that effective end-use dilutions or concentrations are in the range of from about 0.05 percent to about 0.5 percent wherein the higher concnetrations within this range are insecticidally effective and the lower concentrations insectifugally effective.

EXAMPLE 13

Insecticidal aerosol compositions containing the ingredients in the amounts listed below were prepared:

TABLE I

| Ingredient, percent | Composition No. | | | |
|---|---|---|---|---|
| | 1 | 2 | 3 | 4 |
| Pyrethrins | 0.25 | 0.25 | | |
| Allethrin | | | 0.25 | 0.25 |
| Tropital [1] | 1.00 | 1.00 | 1.00 | 1.00 |
| Terpene ether [2] | | 1.00 | | 1.00 |
| Deodorized kerosene | 13.75 | 17.75 | 13.75 | 17.75 |
| Freon 11 | 42.50 | 40.00 | 42.50 | 40.00 |
| Freon 12 | 42.50 | 40.00 | 42.50 | 40.00 |

[1] Bis [2-(2'-butoxyethoxy)ethyl] acetal of piperonal.
[2] β-Diethylamino-ethoxy-ethoxy campnane, also sometimes referred to as 2[2-(N,N diethylaminoethoxy)ethyl]isobornyl ether.

A standard insecticidal aerosol composition of known insecticidal activity containing 2 percent by weight of pyrethrum extract, 2 percent DDT, 6 percent 5-norbornene-2,3-dicarboximide - 1,4,5,6,7,7 - hexachloro - n-(ethyl-mercuri-), 5 percent deodorized kerosene and 85 percent of a 50—50 mixture of Freon 11 and Freon 12 was prepared. Houseflies were contacted with this insecticide in accordance with the procedure of Example 1. The test served as a positive control. Compositions 1, 2, 3 and 4 were sprayed into screen-sleeved cages identical to those described in Example 1 to contact the houseflies with the areosol. The standardized insecticide knocked down 20 of the 50 houseflies within 5 minutes, 25 within 10 minutes and 30 within 15 minutes. Thirty-five of the houseflies in the cake were killed within 24 hours. Composition 1 knocked down 13 percent more houseflies within 5 minutes, 21 percent more houeflies within 10 minutes and 20 percent more houseflies within 15 minutes than did the standard aerosol. A ten percent increase in kill was observed in 24 hours. Composition 2 containing the diethylamino-ethoxy-ethoxy camphane knocked down 16 percent more houseflies within 5 minutes, 27 percent more within 10 and 15 minutes, and had a 25 percent increase in kill within 24 hours over the kill exhibited by the standard aeorsol insecticide. Composition 3 which was a control composition exhibited substantially less knockdown and kill than did the standard aerosol insecticide. Composition 4 containing the camphanyl ether exhibited significantly greater knockdown and kill (e.g. 6 percent in 5 minutes, 13 percent in 10 minutes, and 14 percent in 15 minutes) and exhibited the same amount of kill as the standard insecticide.

The above experiments demonstrate that the β-diethylamino-ethoxy-ethoxy camphane synergizes the insectiphobic activity of pyrethrins and an allethrin.

EXAMPLE 14

Insecticide compositions containing the ingredients in the amounts listed below were prepared:

TABLE II

| Ingredient, percent | Composition No. | | | | | |
|---|---|---|---|---|---|---|
| | 5 | 6 | 7 | 8 | 9 | 10 |
| Neopynamin | 0.03 | 0.03 | 0.03 | | | |
| Tropital [1] | 0.24 | 0.24 | | | | 0.24 |
| Terpene ether [2] | | 0.35 | | | 0.35 | 0.35 |
| Piperonyl butoxide | | | | 0.24 | 0.24 | 0.24 |
| BFC [3] | | | | | 0.05 | 0.03 | 0.03 |
| Deodorized kerosene | 99.73 | 99.38 | 99.73 | 99.71 | 99.36 | 99.36 |

[1] bis [2-(2'-butoxyethoxy)ethyl] acetal of piperonal.
[2] β-diethylamino-ethoxy-ethoxy camphane.
[3] 5-benzyl-3-furfuryl-±-cis-trans chrysanthemmate.

A standard insecticide at known insecticidal activity consisting of 114 milligrams pyrethrum dispersed in 100 ml. of deodorized kerosene served as a positive control. The compositions were sprayed on separate groups of houseflies using the procedure described in Example 1. Compositions 6, 9 and 10 containing the β-diethylaminoethoxy-ethoxy camphane killed, respectively, 44, 49 and 46 percent more houseflies than the standard test insecticide. Compositions 5, 7 and 8, respectively, killed 11, 26 and 46 percent more houseflies than the standard test insecticide thereby demonstrating the superiority of the insecticidal activity of the camphane ether over the standard test insecticide and insecticidal compositions which did not contain the ether.

When the verbenyl, carvyl, geranyl or the farnesyl analogs of the camphane ether are used in place of the camphane ether employed in Example 14, the percentage of knockdown and kill of houseflies is similar to the results obtained with the camphane ether.

Example 14 demonstrates that the β-diethylaminoethoxy-ethoxy camphane is a potent insectiphobic agent in itself in addition to acting as a synergistic agent for pyrethrins as demonstrated in Example 13.

EXAMPLE 15

Insecticidal compositions containing the ingredients in the amounts lised below were prepared.

TABLE III

| Ingredient percent | Composition No. | | | |
|---|---|---|---|---|
| | 11 | 12 | 13 | 14 |
| Terpene ether [1] | 1.00 | 1.00 | 0.35 | 1.0 |
| Piperonyl butoxide | | 0.35 | 0.35 | 0.1 |
| Triton X-100 | 1.00 | 1.00 | 1.00 | 1.00 |
| Water | 98.00 | 97.65 | 98.30 | 97.9 |

[1] β-Diethylamino-ethoxy-ethyl ether of terpineol.

Groups of houseflies were treated in accordance with the procedure of Example 1. Substantially all of the insects treated with compositions 11 and 12 (3 replicate experiments) are knocked down and remain in this state at 15, 30 and 60 minute periods. Twenty-five percent of the houseflies treated with composition 11 were dead at 24 hours and 77 percent of the animals treated with composition 12 were dead at the end of 24 hours. From ⅔ to ¾ of the houseflies treated with composition 13 were knocked down at 15, 30 and 60 minutes and 45 percent of the houseflies were dead within 24 hours. From 80 to 95 percent of the houseflies that were treated with composition 14 were knocked down at 15, 30 and 60 minutes when treated with the composition and 32 percent of the houseflies were dead within 24 hours. The foregoing example demonstrates that the terpinyl ether described therein is an excellent insecticide in that it is synergized or potentiated by piperonyl butoxide. When the corresponding pinocarvyl ether is employed in the compositions of Example 14 in place of the terpinyl ether employed in that example substantially the same results are obtained.

Example 15 demonstrates that the β-diethylaminoethoxy-ethyl ether of terpineol is an insectiphobe per se and that its insectiphobic activity is synergized by piperonyl butoxide.

EXAMPLE 16

Two separate dispersions containing one percent and 0.35 percent by weight, respectively, of β-diethylaminoethyl thioether of octanol in acetone were dispersed in distilled water containing one percent by weight of an emulsifying agent (Triton X-100, a commercially available non-ionic surfactant which is an ethylene oxide condensate of ethylene oxide and octyl phenol).

Groups of houseflies were contacted with the dispersions using the procedure of Example 1. Three (3) replicate groups of houseflies were treated in each instance. Between 80 and 100 percent of the houseflies which were contacted with the one percent solution were knocked down within 15 minutes and all were dead within 24 hours. Between 85 and 100 percent of the houseflies treated with solutions containing 0.35 weight percent of the ether were knocked down within 60 minutes and 25 percent of the houseflies were dead at 24 hours. To the above solution containing 0.35 weight percent of thioether, there was added piperonyl butoxide in an amount sufficient to provide 0.35 weight percent piperonyl butoxide and 0.35 weight percent of the thioether. One hundred percent of the flies contacted with this formula were knocked down within 15 minutes and 95 percent of the flies treated were dead within 24 hours.

EXAMPLE 17

The 0.35 percent dispersion of the thioether employed in Example 16 was used to treat garden pea plants which were infested with pea aphids in accordance with the procedure of Example 4. After 48 hours, 90 percent of the pea aphids of the treated plants had been killed. The 35 percent dispersion was then used to treat bean plants infested with Mexican bean beetles using the procedure described in Example 3. Forty-eight hours after treatment of the plants all of the bean beetles had been killed.

EXAMPLE 18

A 0.35 percent dispersion of β-diethylaminoethyl ether of di-isobutenyl carbinol was used to treat infested pea aphid plants using the procedure described in Example 4. Forty-eight hours after contacting the pea plants, 90 percent of the aphids were dead. The diethylaminoethyl ether was also used to treat bean plants infested with Mexican bean beetles using the procedure of Example 3. After 48 hours, 40 percent of the bean beetles infesting the plants were killed.

EXAMPLE 19

Separate acetone dispersions containing 0.35 weight percent of one of the compounds listed in Table IV below were evaluated for insecticidal activity against Mexican bean beetles using the procedure of Example 3. The percent of insects killed is also listed in Table IV.

TABLE IV

| Compound: | Insects killed (percent) |
|---|---|
| β-diethylaminoethyl 3,7-dimethyloctyl ether | 100 |
| β-diethylaminoethyl adamantyl ether | 70 |
| β-diethylaminoethyl oleyl ether | 80 |
| β-diethylaminoethyl caryophyllyl ether | 90 |

EXAMPLE 20

Separate acetone dispersions containing 0.35 weight percent of one of the compounds listed in Table V were evaluated for insecticidal activity against pea aphids using the procedure described in Example 4. The percent of insects killed is shown in Table V.

TABLE V

| Compound | Insects killed (percent) | |
|---|---|---|
| | 48 hours | 5 days |
| β-Diethylaminoethyl 3,7-dimethyloctyl ether | 90 | 100 |
| β-Diethylaminoethyl orthochlorophenyl ether | 80 | 100 |
| β-Diethylaminoethyl oleyl ether | 80 | 100 |
| β-Diethylaminoethyl caryophyllyl ether | 0 | 70 |
| β-Diethylaminoethyl phenyl thioether | 70 | 100 |

EXAMPLE 21

Separate acetone dispersions containing 0.35 weight percent of one of the compounds listed in Table VI were evaluated for insecticidal activity against spider mites using the procedure described in Example 7. The percent of insects killed are also shown in Table VI.

TABLE VI

| Compound: | Insects killed (percent) |
|---|---|
| β-diethylaminoethyl 3,7-dimethyloctyl ether | 90 |
| β-diethylaminoethyl oleyl ether | 100 |
| β-diethylaminoethyl α-naphthyl ether | 90 |
| β-diethylaminoethyl caryophyllyl ether | 100 |
| β-diethylaminoethyl cyclohexyl ether | 80 |
| β-diethylaminoethyl phenyl thioether | 81 |

When the β - diethylaminoethoxyethyldimethyloctyl, adamantyl, oleyl, caryophyllyl, orthochlorophenyl, phenyl, naphthyl, and cyclohexyl ethers and thioethers are substituted for the corresponding ether analogs employed in Example 19 through 21 substantially all of the bettles, aphids and spider mites are killed.

EXAMPLE 22

Separate acetone dispersions containing 0.35 weight percent of one of the compounds listed in Table VII were evaluated for insecticidal activity against pea aphids using the procedure described in Example 4. The percent of insects killed by the dispersions is shown in Table VII.

TABLE VII

| Compound: | Insects killed (percent) |
|---|---|
| β-diethylaminoethyl carane methyl carbinyl ether | 100 |
| β-diethylaminoethyl carane carbinyl ether | 100 |
| β-diethylaminoethyl farnesyl ether | 100 |

EXAMPLE 23

Separate acetone dispersions containing 0.35 weight percent of one of the compounds listed in Table VIII were evaluated for insecticidal activity against spider mites using the procedure described in Example 7. The percent of insects killed by the dispersions are shown in Table VIII.

TABLE VIII

| Compound: | Insects killed (percent) |
|---|---|
| β-diethylaminoethyl carane methyl carbinyl ether | 100 |
| β-diethylaminoethyl carane carbinyl ether | 100 |
| β-diethylaminoethyl farnesyl ether | 100 |

When the thioether analogs of the compounds of Examples 22 and 23 are used instead of the ethers employed in those examples against pea aphids and spider mites 100 percent of the insects are killed.

What is claimed is:

1. An insect-controlling composition comprising from about 0.1 to about 90 weight percent of a β-dialkylaminoalkyl ether and a carrier therefor, said ether being a compound of the formula:

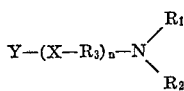

where Y is selected from the group consisting of terpenyl; sesquiterpenyl; saturated acyclic aliphatic groups containing from 1 to 12 carbon atoms; unsaturated acylic aliphatic groups containing from 3 to 18 carbon atoms; saturated cyclo aliphatic groups containing from 5 to 8 carbon atoms; unsaturated cyclo aliphatic groups containing between 5 and 12 carbon atoms; monocyclic, bicyclic, and tricyclic aryl groups; monocyclic and bicyclic alkaryl groups containing from 1 to 2 carbon atoms in the alkyl group; monocyclic aralkyl groups containing between 1 and 6 carbon atoms in the alkyl group; and halo-, nitro-, and amino-substituted derivatives thereof; $R_3$ is lower alkylene; $R_1$ and $R_2$ are like or dissimilar lower alkyls; $n$ is an integer of 1 to 3; X is sulfur or oxygen, and when $n$ is greater than 1, X represents at least 1 oxygen atom.

2. The composition of claim 1 where, in said compound, $n$ is 1, and X is sulfur.

3. The composition of claim 2 where, in said compound, $R_3$ is ethylene and $R_1$ and $R_2$ are ethyl.

4. The composition of claim 3 where, in said compound, Y is a saturated acyclic aliphatic group.

5. The composition of claim 3 where, in said compound, Y is an unsaturated acyclic aliphatic group.

6. The composition of claim 3 where, in said compound, Y is a cyclo aliphatic group.

7. The composition of claim 3 where, in said compound, Y is monocyclic, bicyclic, or tricyclic aryl.

8. The composition of claim 1 where, in said compound, Y is terpenyl.

9. The composition of claim 1, where, in said compound Y is acyclic terpenyl.

10. The composition of claim 1, where, in said compound, Y is monocyclic terpenyl.

11. The composition of claim 1 where, in said compound, Y is bicyclic terpenyl.

12. The composition of claim 1 where, in said compound, Y is sesquiterpenyl.

13. The composition of claim 1 where said ether is a compound of the formula:

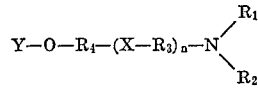

where $R_4$ is lower alkylene, X is sulfur or oxygen and $n$ is an interger of 1 or 2.

14. The composition of claim 13 where, in said compound, $n$ is one and X is oxygen.

15. The composition of claim 14 where, in said compound, $R_3$ and $R_4$ are ethylene and $R_1$ and $R_2$ are ethyl.

16. The composition of claim 15 where, in said compound, Y is a saturated acyclic aliphatic group.

17. The composition of claim 15 where, in said compound, Y is an unsaturated acyclic aliphatic group.

18. The composition of claim 15 where, in said compound, Y is a cyclo aliphatic group.

19. The composition of claim 10 where, in said compound, Y is monocyclic, bicyclic, or tricyclic aryl.

20. The composition of claim 13 where, said ether $n$ is 1 and Z is sulfur.

21. The composition of claim 13 where, in said compound, Y is sesquiterpenyl.

22. The composition of claim 13 where, in said compound, Y is terpenyl.

23. The composition of claim 22 where, in said compound, Y is acyclic terpenyl.

24. The composition of claim 22 where, in said compound, Y is monocyclic terpenyl.

25. The composition of claim 22 where, in said compound, Y is bicyclic terpenyl.

26. A process for controlling insects, which comprises contacting an insect environment with an amount sufficient to kill or repel insects with a compound of the formula:

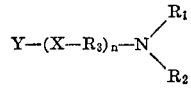

where Y is an organic radical selected from the group consisting of terpenyl; sesquiterpenyl; saturated acyclic aliphatic groups containing from 1 to 12 carbon atoms; unsaturated acyclic aliphatic groups containing from 3 to 18 carbon atoms; saturated cyclo aliphatic groups containing from 5 to 8 carbon atoms; unsaturated cyclo aliphatic groups containing between 5 and 12 carbon atoms; monocyclic, bicyclic, and tricyclic aryl groups, monocyclic and bicyclic alkaryl groups containing from 1 to 2 carbon atoms in the alkyl group; monocyclic aralkyl groups containing between 1 and 6 carbon atoms in the alkyl group; and halo-, nitro-, and amino-substituted derivatives thereof; $R_3$ is lower alkylene, $R_1$ and $R_2$ are like or dissimilar lower alkyls; $n$ is an integer of 1 to 3; X is sulfur or oxygen, and when $n$ is greater than 1, X represents at least 1 oxygen atoms.

27. The process of claim 26 where, in said compound, $n$ is 1, and X is oxygen.

28. The process of claim 27 where, in said compound, $R_3$ is ethylene and $R_1$ and $R_2$ are ethyl.

29. The process of claim 28 where, in said compound, Y is terpenyl.

30. The process of claim 28 where, in said compound, Y is sesquiterpenyl.
31. The process of claim 26 where, in said compound, Y is an unsaturated acyclic aliphatic group.
32. The process of claim 26 where, in said compound, Y is a cyclo aliphatic group.
33. The process of claim 26 where, in said compound, Y is a monocyclic, bicyclic, or tricyclic aryl group.
34. The process of claim 26 where, in said compound, $n$ is two and X is oxygen.
35. The process of claim 34 where, in said compound, $R_3$ is ethylene and $R_1$ and $F_2$ are ethyl.
36. The process of claim 35 where, in said compound, Y is a saturated acyclic aliphatic group.
37. The process of claim 35 where, in said compound, Y is an unsaturated acyclic aliphatic group.
38. The process of claim 35 where, in said compound, Y is a cyclo aliphatic group.
39. The process of claim 35 where, in said compound, Y is an monocyclic, bicyclic, or tricyclic aryl group.
40. The process of claim 26 where said compound has the formula:

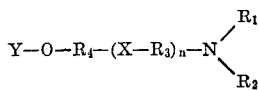

where $R_4$ is lower alkylene and $n$ is an integer of 1 or 2.

41. The process of claim 40 where, in said compound, $n$ is 1, and X is oxygen.
42. The process of claim 41 where, in said compound, $R_3$ and $R_4$ are ethylene and $R_1$ and $R_2$ are ethyl.
43. The process of claim 42 where, in said compound, Y is terpenyl.
44. The process of claim 42 where, in said compound, Y is sesquiterpenyl.
45. The process of claim 40 where, in said compound, Y is a saturated acyclic aliphatic group.
46. The process of claim 40 where, in said compound, Y is an unsaturated acyclic aliphatic group.
47. The process of claim 40 where, in said compound, Y is a cyclo aliphatic group.
48. The process of claim 40 where, in said compound, Y is a monocyclic bicyclic, or tricyclic aryl group.
49. The process of claim 40 where, in said compound, X is sulfur and $n$ is one.

References Cited
UNITED STATES PATENTS
3,313,682   4/1967   Zenitz _____ 424—325

ALBERT T. MEYERS, Primary Examiner
F. E. WADDELL, Assistant Examiner

U.S. Cl. X.R.
424—330, 337, 341, 342, DIG. 10